United States Patent [19]

Kohlwey

[11] Patent Number: 4,649,055

[45] Date of Patent: Mar. 10, 1987

[54] PROCESS FOR PRODUCING IMPROVED DEHYDRATED RICE AND PRODUCT

[75] Inventor: David E. Kohlwey, Houston, Tex.

[73] Assignee: Louisiana State Rice Milling Company Inc., Houston, Tex.

[21] Appl. No.: 570,629

[22] Filed: Jan. 13, 1984

[51] Int. Cl.$^4$ .............................................. A23L 1/182
[52] U.S. Cl. .................................... 426/449; 426/443; 426/459; 426/462; 99/323.4
[58] Field of Search ............... 426/625, 626, 618, 450, 426/445, 459, 462, 281, 508

[56] References Cited

U.S. PATENT DOCUMENTS

| | | | |
|---|---|---|---|
| 2,438,939 | 4/1948 | Ozai-Durrani | 426/450 |
| 2,616,808 | 11/1952 | Roberta | 426/450 |
| 2,696,156 | 12/1954 | Campbell et al. | 426/450 |
| 2,696,157 | 12/1954 | Campbell et al. | 426/450 |
| 2,696,158 | 12/1954 | Campbell et al. | 426/450 |
| 2,715,579 | 8/1955 | Roberts | 426/450 |
| 2,720,460 | 10/1955 | Flynn et al. | 426/450 |
| 2,740,719 | 4/1956 | Ozai-Durrani | 426/461 |
| 2,828,209 | 3/1958 | Hollis et al. | 426/462 |
| 3,086,867 | 4/1963 | Miller | 426/450 |
| 3,189,462 | 6/1965 | Autrey et al. | 426/462 |
| 3,408,202 | 10/1968 | Serbia et al. | 426/450 |
| 3,484,249 | 12/1969 | Tanaka et al. | 426/626 |
| 3,582,352 | 6/1971 | Yasumatsu et al. | 426/618 |
| 3,694,226 | 9/1972 | Howland et al. | 426/462 |
| 3,701,667 | 10/1972 | Heki et al. | 99/323.4 |
| 3,879,566 | 4/1975 | Cox et al. | 426/462 |
| 4,233,327 | 11/1980 | Ando et al. | 426/625 |
| 4,333,960 | 6/1982 | Barry et al. | 426/450 |
| 4,385,074 | 5/1983 | Weibye | 426/618 |
| 4,548,830 | 10/1985 | Kayama | 426/640 |

FOREIGN PATENT DOCUMENTS 928788 6/1963 United Kingdom ............... 426/445

OTHER PUBLICATIONS

R. Daniels 1970 Rice and Bulgur Quick-Cooking Processes Noyes Data Corpl. Park Ridge NJ., pp. 72-85.
Kugimiya, et al., "Phase Transitions of Amylose-Lipid Complexes in Starch; A Calorimetric Study", Starke 32, pp. 265-270.
Burt et al., "Gelatinization of Low Water Content Wheat Starch-Water Mixtures", Starke 35; pp. 354-360.
Donovan, et al., "Differential Scanning Calorimetry of Heat-Moisture Treated Wheat and Potato Starches", American Association of Cereal Chemists Annual Meeting 1982 Talk No. 171.
Eliasson, "Effect of Water Content on the Gelatinization of Wheat Starch", Starke 32, pp. 270-272.

Primary Examiner—Raymond N. Jones
Assistant Examiner—Carolyn Paden
Attorney, Agent, or Firm—Delmar L. Sroufe

[57] ABSTRACT

The process of the invention may be employed with raw or parboiled non-waxy rice and produces a cooked and dehydrated rice. In a preferred embodiment the cooked and dehydrated rice is expanded, or puffed, to produce a rice product capable of rehydration to palatable textural state within 90 seconds after the addition of boiling water. The process consists of gelatininzing and glassifying the rice, and then drying the rice. The preferred process employs this process and then expands, or puffs, the rice. Apparatus for expanding rice in accordance with the preferred process is provided.

15 Claims, 8 Drawing Figures

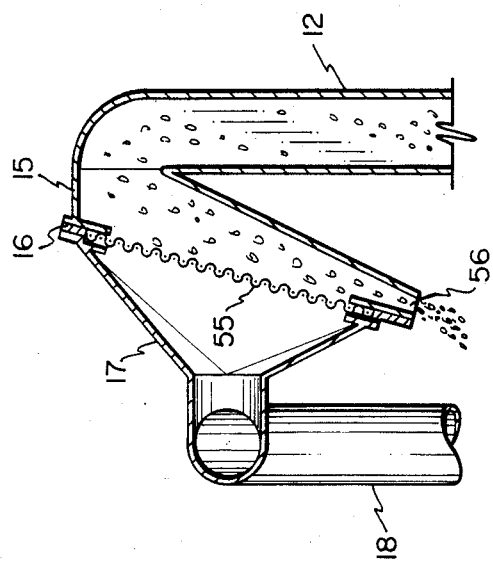
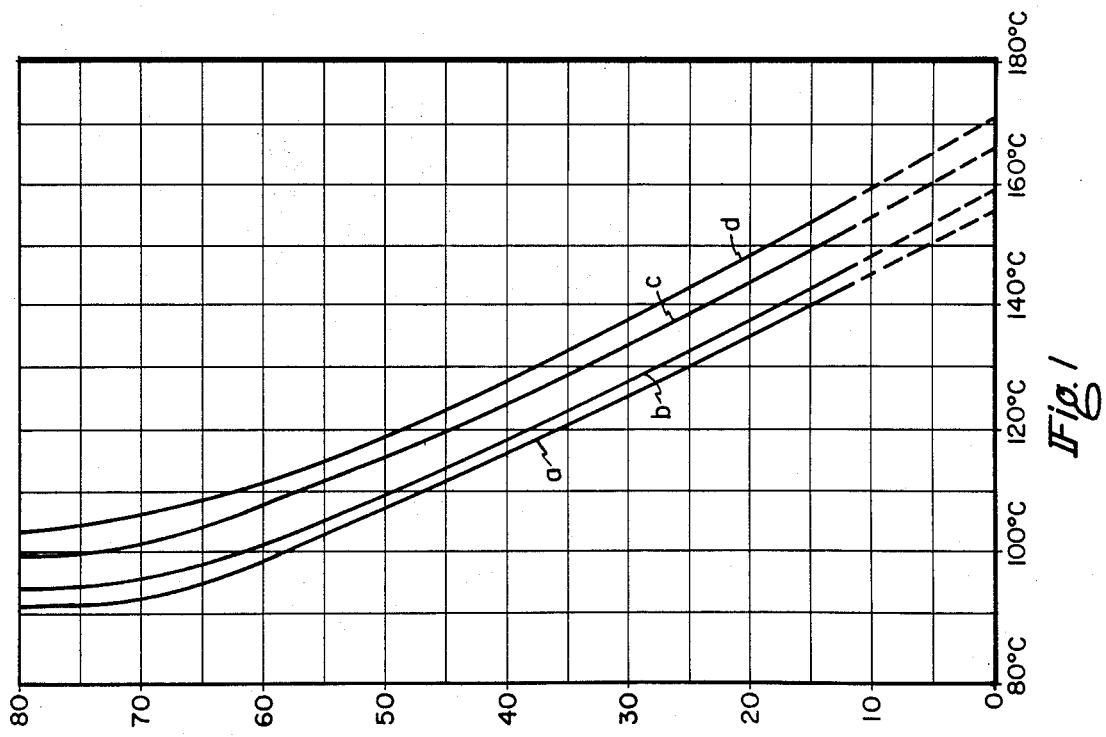
Fig. 6
Fig. 1

Fig. 2

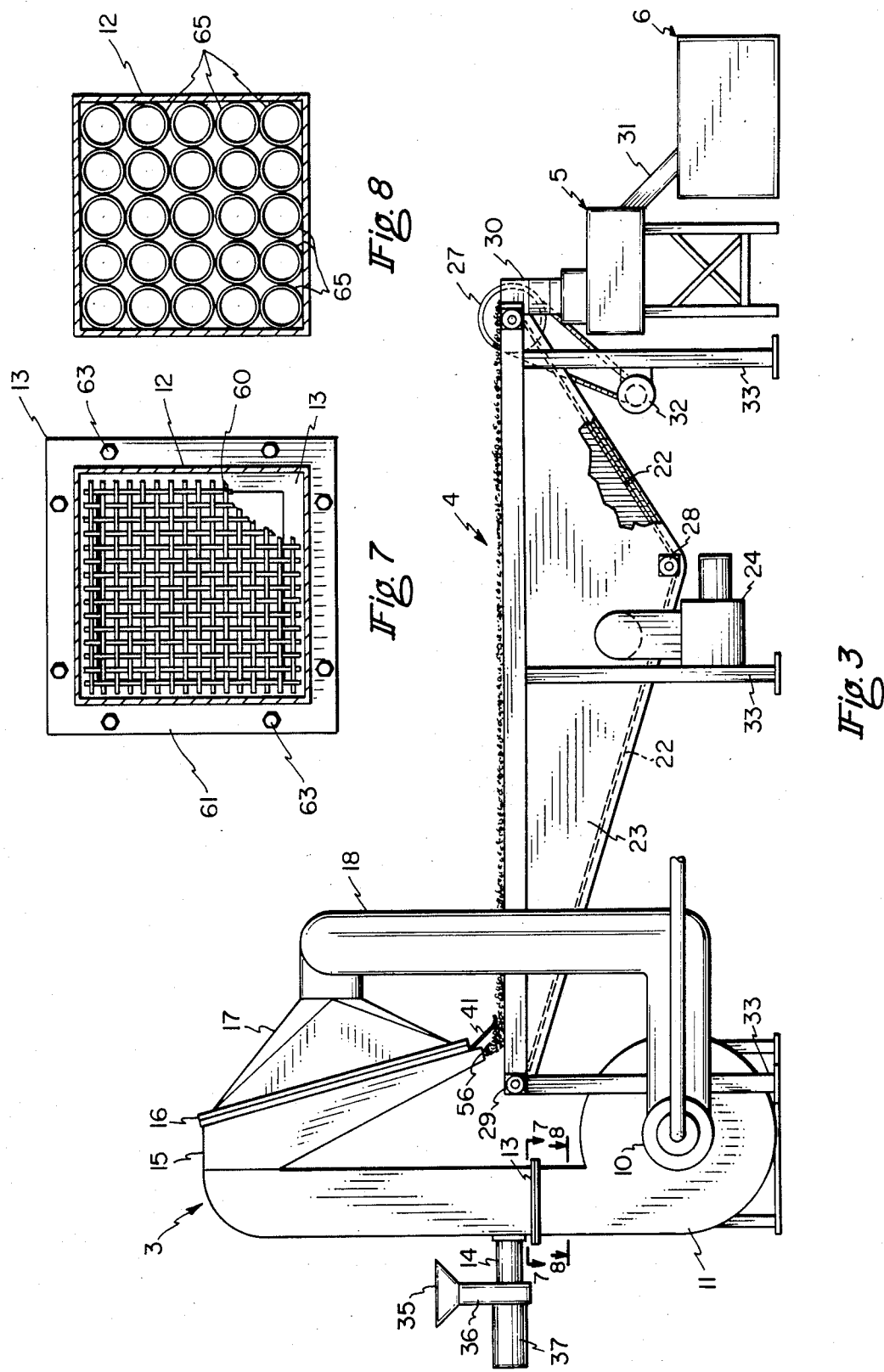

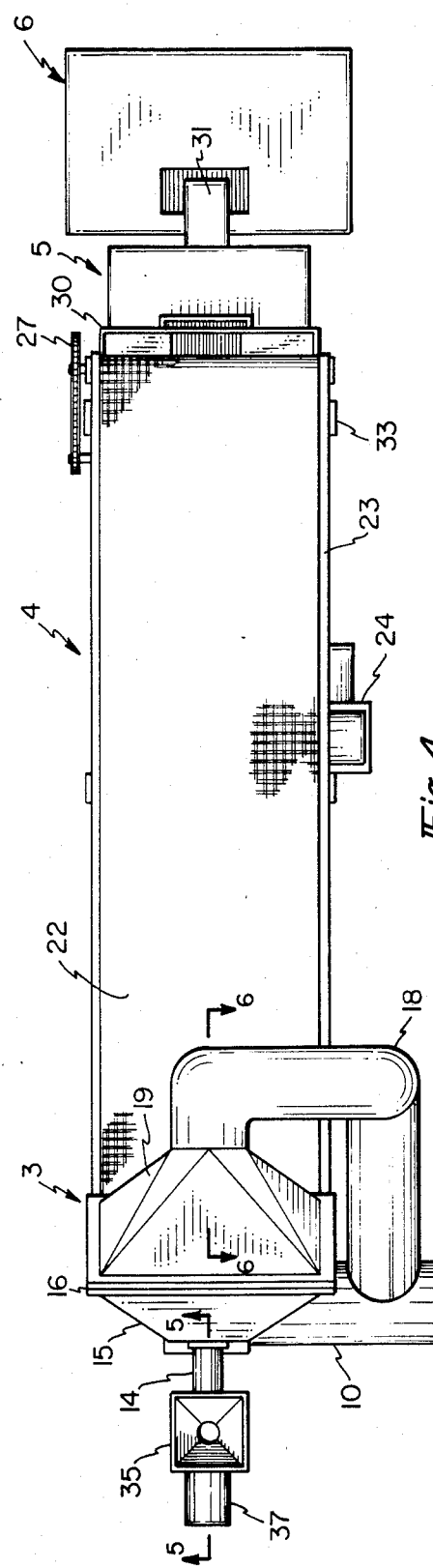
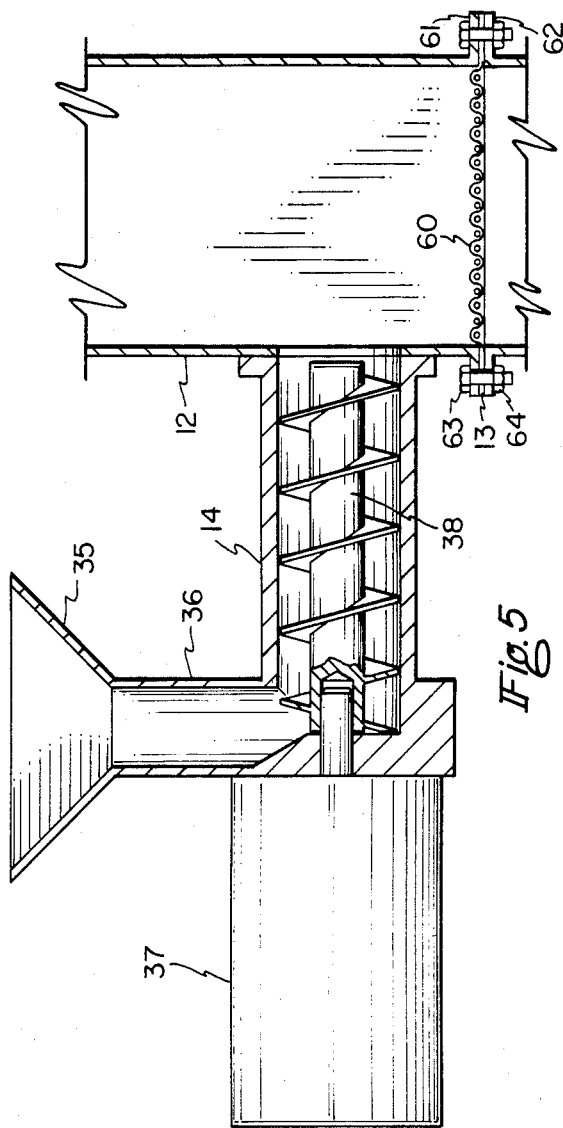

PROCESS FOR PRODUCING IMPROVED DEHYDRATED RICE AND PRODUCT

BACKGROUND OF THE INVENTION

This invention relates to the processing of rice to produce dehydrated rice products, and more particularly, relates to the processing of rice to produce precooked and dehydrated rice products for use as precooked rice products. In a preferred embodiment of the invention produces a precooked and dehydrated rice product for use in dehydrated foods such as soups and other foods which require only the addition of boiling water to provide a cooked and palatable food.

Precooked and dehydrated foodstuffs for use in dehydrated food mixes preferrably require only the addition of a specified quantity of boiling water to both warm and reconstitute the foodstuff to a palatable, hydrated condition. Such foodstuffs do not require any additional cooking to render them ready to eat and are capable of being consumed within a few minutes after the addition of the boiling water.

Typically, dehydrated food mixes come in a package which serves to store the product and serves as a moisture barrier. For some ready-to-eat products the package may also serve as the eating container, after rehydration with boiling water. These food mixes have initially been confined to simple products having a relatively small number of constituents, such as soups, but now include many diverse and complex products, such as entire dinners.

Further, these food mixes have tended to include wheat products because wheat products do not require a complete wheat "grain" to be recognized as a foodstuff and are thereby easily included in non-grain processed forms that are coked and dehydrated. For example, soups may include cooked and dehydrated noodles that are very thin to allow for quick rehydration of the noodle. The desire to include whole grain rice products in these foodstuffs has led to the need for a precooked and dehydrated whole grain rice product compatible with other such precooked and dehydrated foodstuffs. However, such a whole grain rice product must have an appearance similar to conventionally cooked rice grains, as well as being comparable in taste, or palatability, texture, and stickiness.

Although the need for such a precooked and dehydrated rice product has been known for some time, the existing products and processes for producing these products have not been completely successful on a commercial basis. U.S. Pat. No. 4,333,960 to Barry et al discusses the shortcomings of some of the processes available in this area. In summary, Barry et al states that these prior processes are not commercially successful because they: (1) require additional cooking after the addition of boiling water, or (2) produce a ready to eat product not requiring rehydration, or (3) use an initial raw rice product that results in materials that are difficult, if not impossible, to handle on an economic and commercial scale.

U.S. Pat. No. 4,333,960 to Barry et al does not easily lend itself to an economical and continuous commercial process because of its initial "soaking" step. Further, as taught in this patent, the color of the product after the "puffing" step is very dependent upon the "puffing" temperature and the product is easily scorched or burned at the higher puffing temperatures taught in this patent.

Further the Barry et al process, and other prior art processes, are designed to prevent any bursting, or popping, of starch granules in the rice grain. This prevention of bursting is to minimize cooking losses, but such processes provide starch of reduced solubility in the starch granules, as compared with the solubility of starch outside the granules. However, increasing the solubility of starch substantially increases the rate of rehydration especially for expanded, or "puffed", rice grains, as compared to rice grains which have been expanded with intact starch granules.

These and other limitations and disadvantages of the prior art are overcome by the present invention, and improved methods and apparatus are provided for producing a cooked and dehydrated rice capable of rapid rehydration, using an economical and continuous commercial process.

SUMMARY OF INVENTION

In a preferred embodiment of the present invention, processes for producing improved cooked and dehydrated rice products are provided. The process consists of partially gelatinizing and hydrating non-waxy parboiled rice in moderately acidic hot water, steaming the rice to completely gelatinize and glassify the rice, and then drying the rice. In a preferred process, the dried rice is then expanded. These processes may be employed by equipment used to prepare commercial instantized rice, with minor modifications, preferably in combination with appropriate expanding apparatus, on a continuous basis, rather than a batch basis.

Alternatively, the process may consist of hydrating and partially gelatinizing non-waxy raw (white or brown) rice by soaking in moderately acidic warm water and then multiple steamings and washings; gelatinizing and glassifying the rice by steaming; and then drying the rice. In a preferred process the glassified rice is then expanded. These processes may also be employed by equipment used to prepare instantized rice, with minor modifications, preferably in combination with appropriate expanding apparatus.

An additional alternate process may consist of hydrating, gelatinizing and glassifying rice by steaming at pressures greater than atmospheric pressure, drying the rice, and then preferrably, expanding the rice.

It is an object of the present invention to provide a cooked and dehydrated rice product.

It is also an object of the present invention to provide processes for producing a cooked and dehydrated rice product.

It is a further object of the present invention to provide an expanded, cooked and dehydrated rice product capable of rehydration to a palatable state within one and one-half minutes after the addition of boiling water.

It is an additional object of the present invention to provide processes for economically producing an expanded, cooked and dehydrated rice product capable of rehydration to a palatable state within one and one-half minutes after the addition of boiling water.

It is yet an additional object of the present invention to provide apparatus for use in the process for producing an expanded, cooked and dehydrated rice product.

It is a specific object of the present invention to provide a process for producing a cooked and dehydrated rice, comprising: glassifying dried rice of a predetermined moisture content and variety at a temperature functionally related to said moisture content and variety, and thereafter drying said glassified rice.

It is a further specific object of the present invention to provide a process for producing a cooked and dehydrated rice, comprising: glassifying dried rice of a predetermined moisture content and variety at a temperature functionally related to said moisture content and variety, drying said glassified rice, and thereafter expanding said dried rice.

It is yet a further specific object of the present invention to provide apparatus for expanding rice, comprising: hot air means for supplying hot air at a preselected temperature, blower means adjacent said hot air means for increasing the speed of said hot air, expansion means interconnected with said blower means to receive said hot air and for receiving rice to be fluidized and expanded by said hot air therein, and product separation means interconnected with said expansion means for removing said expanded rice from said apparatus.

These and other objects and advantages of the present invention will become apparent from the following detailed description, wherein reference is made to the figures in the accompanying drawings.

IN THE DRAWINGS

FIG. 1 is a simplified pictorial diagram of curves representing glassification temperatures for different varieties of rice grains at different moisture contents.

FIG. 2 is a simplified pictorial illustration of an expander, and cooling and packaging apparatus, partially in cross-section, for use in the process of the invention.

FIG. 3 is a side view of the apparatus depicted in FIG. 2.

FIG. 4 is a top view of the apparatus depicted in FIG. 2.

FIG. 5 is an enlarged cross-sectional side view of a portion of the apparatus depicted in FIG. 4.

FIG. 6 is a cross-sectional side view of a portion of the apparatus depicted in FIG. 4.

FIG. 7 is an enlarged top view, partially in cross-section, of a different portion of the apparatus depicted in FIG. 3.

FIG. 8 is an enlarged cross-sectional view of a different portion of the apparatus depicted in FIG. 3.

DETAILED DESCRIPTION

The processes of the present invention provide improved cooked and dehydrated rice products. The processes of the present invention may be practiced over widely varying moisture contents and with most varieties of rice. Referring to FIG. 1, there may be seen curves depicting energy input for temperatures at which glassification occurs for different moisture contents of different varieties of rice. The "x" axis corresponds to glassification temperatures in °C. and the "y" axis corresponds to moisture content in percent by weight.

As used herein, the term glassification, or glassifying, is used to mean the process wherein the amylose-lipid complexes in the rice grain are melted, or broken by heat. The temperatures at which glassification occurs, decreases for increases in moisture content in the rice grain, as depicted in FIG. 1. Glassification also occurs in a narrow temperature band for a specific moisture content and rice variety. However, the processes of the present invention are not applicable to waxy rices, as they contain very little or no amylose.

Thus, curves a and b of FIG. 1 depict the band of temperatures during glassification corresponding to an increasing rate of energy input into a given variety of rice. Curves c and d depict the band of glassification temperatures corresponding to a decreasing rate of energy input, and curves b and c of FIG. 1 depict the band of glassification temperatures corresponding to a constant rate of energy input into this variety of rice.

The curves of FIG. 1 may be obtained from a differential scanning calorimeter and represent volume fractions of water converted to moisture contents. The distance between the curves, or width of the glassification temperature band, is primarily determined by the rate of heating employed in the differential scanning calorimeter. For a given rice variety and different heating rates, the center of the band remains at approximately the same temperature.

However, for different rice varieties the center of the band may change slightly. Therefore, to determine the specific glassification temperature band for a selected moisture content, a sample must be run in a differential scanning calorimeter. This step may be avoided by employing a temperature at least as high as the center of the band of curves of FIG. 1, i.e. the center of curves b and c, or preferrably a temperature greater than curve d of FIG. 1, for the selected moisture content.

As used herein, the term gelatinization, or gelatinizing, is used to mean the process wherein the starch granules in a rice grain have lost all birefringence and the crystalline structure in the starch granule is disrupted. The temperatures at which this process occurs increases with decreasing moisture content in the rice grain. Further, for a specific moisture content, the temperature over which the process begins and ends is a narrow band of temperatures, typically a few degrees, i.e. 3°–5° C. This definition is in accord with most, but not all, of the prior art dealing with starches.

When rice grains are both gelatinized and glassified the internal structure of grain is disrupted and the starch granules melt, or dissolve such that the resulting grain when cooled and dried has an oval or flattened cross-section. A rice grain that has only been gelatinized has the usual circular cross-section upon cooling and drying. The lack of internal structure in a cooled and dried glassified grain is presently believed to cause the observed translucence of glassified and dried rice grains.

The glassification process is used in the processes of the invention to increase the solubility of starch in the rice grain and improve its ability to rapidly rehydrate, especially after expansion. The glassification process places the interior of the rice grain in a uniform glass-like state and removes as much of the residual internal structure as is possible. This process combined with the gelatinization process surprisingly allows for a much more rapid rehydration of the interior of the rice grain (after expansion) than a rice grain only taken through the gelatinization process.

For a given moisture content, the temperature for glassification is normally greater than the temperature for gelatinization. However, the gelatinization temperature band is currently theorized and believed to increase at a faster rate for decreasing moisture content than the rate of increase for the glassification temperature band. A rice grain must normally pass through gelatinization in order to be glassified. However, as the moisture content in the rice grain increases, both these temperature bands shift to lower temperatures. Thus, by processing rice grains at a high moisture content, the temperatures for both of these processes are reduced, which thereby reduces the likelihood of undesirable color in the grain.

Glassification also surprisingly reduces the tendency for stress cracks to develop and a more uniform expanded product results. The glassified product may be used as a precooked rice product, capable of rehydration in above five to twenty minutes at about 100° C. The expanding step is required to expand the volume of the rice grain to allow the grain to rapidly (within one and one-half minutes) rehydrate throughout its entire volume. Expansion, or expanding typically requires a moisture content of 8%–15% for maximum volume expansion.

The processes of the present invention may be practiced in a continuous manner by commercially available equipment conventionally arranged to produce commercial instantized rice, similar to the process taught in U.S. Pat. No. 2,828,209, in combination with appropriate expanding apparatus such as that described later herein.

The processes of the present invention may be employed with non-waxy raw rice or non-waxy parboiled rice. Waxy rice is a special variety of rice having substantial amounts of amylopectin and substantially no amylose.

Parboiled rice is paddy rice that has been steeped in water, briefly steamed, dried, shelled to remove the hull, and then milled to remove the bran layers from the rice grains. Depending upon the temperature of the steeping water parboiled rice may be fully or partially gelatinized. Parboiled rice is readily available in a many varieties, or types, and sizes of rice grain. Parboiled rice is usually preferred for commercial applications because of its enhanced mineral and vitamin content, and because of its discrete grain texture after rehydration and lack of stiffness (i.e. the cooked grains are separate and do not stick together to form a sticky mass of rice grains).

Paddy rice that has been shelled to remove the hull and milled to remove the bran layers is conventionally called white rice. Paddy rice that has been shelled but not milled is typically known as brown rice. The term raw rice is used herein to mean both white rice and brown rice as herein defined.

Parboiled rice, raw rice, or paddy rice may be employed in the processes of the present invention. Referring to FIG. 1 for parboiled rice, saturated steam at atmospheric pressure (corresponding to 100° C.) may be employed to glassify the parboiled rice, if its moisture content is increased above about 60%. Commercially available parboiled rice normally has a moisture content of about 8%–15%. Thus, if atmospheric pressure steam is to be used to glassify the parboiled rice the parboiled rice must be first hydrated.

For parboiled rice, the processes of the invention preferably partially gelatinizes and hydrates the rice in excess water. The water is maintained at a temperature between 70°–100° C. and is moderately acidic, with a pH adjusted between 4.5 to 7.0. Preferably the water temperature is 95° C. and the pH is between 5.5 and 6.5. The acid of the processes of the present invention may be any conventional food processing acid, such as, for example, but not limited to phosphoric or hydrochloric acids.

The parboiled rice is partially cooked, or partially gelatinized, and hydrated in this acidic excess water condition for 10 to 30 minutes, depending upon the variety, crop year, cooking temperature, etc. of rice employed in the processes of the present invention. This hydration and partial cooking, or partial gelatinization, step raises the moisture content of the rice from its initial 8%–15% to a final content of about 60% to 70%, by weight. The moisture content may be raised above 60% to enable the rice grains to be more resistant to any "browning" from high temperatures of subsequent operations and to preferably reduce the temperature at which glassification occurs. This final moisture content also depends upon the variety, crop year, degree of milling, etc. of the rice employed in this process and the maximum internal temperature the rice reaches during this step.

The parboiled rice may be hydrated and partially cooked, according to the processes of the present invention, by employing a commercially available screw type water cooker. Such a water cooker may be easily adjusted to provide the hereinabove described water temperatures and cooking times. Such a water cooker may be employed with additional equipment described later herein to operate according to the processes of the present invention in a preferably continuous mode, or alternatively, in a batch mode.

After hydration and partial cooking, or partial gelatinization, in excess water, the parboiled rice is quickly drained of excess water and according to the processes of the present invention, steamed with saturated steam at substantially atmospheric pressure. Preferably, the steam fully gelatinizes and also glassifies the rice during this step.

The rice is gelatinized and glassified by the steam at a temperature of substantially 100° C. for about 10 to 15 minutes, preferably 12–14 minutes, depending on the depth of bed, variety, crop year, etc. of rice. During this steaming step the moisture content of the rice may be raised slightly. Steam gelatinization and glassification may be accomplished by employing any commercially available steam cooker used for rice.

Such steam cookers conventionally employ steam directed at a moving conveyor belt in a shroud to cook the rice and are open at either end to atmospheric pressure. Thus, the hereinabove described water cooker may discharge the rice and excess water to the conveyor belt of the steam cooker. The point of discharge may be selected to recover and allow reuse of this excess water in the water cooker. The speed of the steam cooker conveyor belt may be easily adjusted to obtain the hereinabove described steaming times.

Also, according to the processes of the present invention, raw rice may be hydrated to increase its moisture content above about 60%, and be partially gelatinized by: first washing, or soaking the rice for at least one minute in water below the gelatinization temperature, and then steaming the rice at atmospheric pressure for 8–20 minutes at 100° C., preferably about 10 minutes. This initial steaming partially gelatinizes the rice grain starch and develops a water absorbing surface layer on the outside of the grain. Thereafter, all subsequent operations may be conducted in a water-limiting fashion to avoid increasing the surface moisture content above about 75%. This steamed rice is then washed, preferably with agitation, or sprayed with water, for about one minute, drained of excess water, and steamed as before, at least three times to hydrate, fully gelatinize, and glassify the rice. Three such washings with agitation, or sprayings, and steamings are equivalent to the previously herein described step of hydration and partial gelatinization for parboiled rice. The final wash with agitation, or spray, should raise the moisture content of 60% to 70%, i.e. this sequence is equivalent to the parboiled rice step of hydrating and partial gelatinization. The final steam step is thus equivalent to the parboiled rice step of gelatinization and glassification. After the last wash and steam step the rice is essentially in the same hydrated, cooked and glassified state as the steamed parboiled rice and continues through the rest of the processes of the invention in the same manner as that described hereinafter for parboiled rice.

Although the processes of the present invention described herein are typically illustrated by use of steam (preferably), as a means of increasing the temperature of rice grains, it should be understood that suitable equivalent methods for increasing the internal energy and temperature of the rice grains are within the scope of these processes. For example, hot gas, or microwave or convection ovens may be employed to increase the temperature of rice grains as described in the processes of this invention.

The steamed parboiled rice may be quenced, or cooled, to prevent any further cooking and to transform the rice from a molten plastic to a rubbery state by immersing the rice for a few seconds in a water bath at a temperature less than about 50° C. This quenching step may be omitted and adjustments made in the final steaming time to compensate for no quenching if the rice is naturally cooled, or cooled with a stream of air at 50° C. or less.

Quenching may be accomplished by the steam cooker conveyor belt dropping the rice into a water bath. The water bath may be arranged to also carry or transport the rice from the steam cooker to the conveyor belt input of a dryer, all within a few seconds.

Alternatively, the processes of the invention may be practiced by hydrating to any desired preselected moisture content below 60% and then gelatinizing and glassifying rice in one step. This "one-step" method may be performed with paddy, raw or parboiled non-waxy rice. This one-step process may be accomplished by heating the rice with steam to a temperature, as indicated in FIG. 1, corresponding to the moisture content and variety of the rice to be employed in the process of the invention for about 1-15 minutes.

However, for rice grains having a moisture content below about 60%, this one-step method will require a temperature greater than 100° C., which requires steam at a pressure greater than atmospheric pressure. By way of example, for 50% moisture content, this temperature is about 110° C. from FIG. 1. For 30% moisture content, this temperature from FIG. 1, is about 130° C. The steam pressure corresponding to these or other selected temperatures may be conveniently obtained from conventional steam tables. Thus, a pressurized steam cooker is generally needed to perform this embodiment of the invention.

According to the processes of the invention, the steamed rice is dried in a dryer. The moisture content is reduced to about 8%-15%, preferably 9%-12%, and most preferably 10%-11%.

The dryer may be a multi-zone conveyor fed, hot air, tunnel dryer. The initial zone may be operated at 100° C., or higher with increased air velocity through the rice bed, with successive zones at lower temperatures in a continuous mode of operation. For a batch mode operation, the initial temperature may be at or above 100° C. and successive temperatures are at such lower temperatures as to ensure the internal rice temperature remains below about 50° C. This prevents browning of the rice in localized high/low moisture areas in the rice bed.

For "raw" glassified rice, the dried rice grain has a dense oval or flattened cross-section and has a clear translucent color. For "parboiled" glassified rice, the dried rice has a dense or flattened oval cross-section and has a slightly yellow translucent color. Both "raw" and "parboiled" glassified rice have moisture contents of 8% to 15%, preferably 9% to 12%, and most preferably 10-11% when dried. The moisture content of the dried rice is thus suitable for long-term storage, if desired.

The rice may optionally be held in such a storage location at 15° to 30° C. for at least 4 hours to temper the rice grains. This tempering step allows the moisture in the grains to fully equilibrate within the lot and within each grain, and thereby to produce a more uniform expanded product. The dehydrated glassified product is suitable for rehydration to produce a palatable cooked rice by treatment with excess water at about 90° to 100° C. for about 5-20 minutes. It is also suitable for storage at these moisture contents and preferably it may then be expanded to produce a rice product for use in dehydrated food mixes, such as, for example, but not limited to, "instant" soup mixes.

Thereafter, the dried rice may be expanded in accordance with the preferred processes of the invention. This expanding step may be accomplished by exposing the grains of rice to hot air at a temperature of 150°-320° C., preferably at least 230° C. The dried rice grains, preferably 9%-12% moisture content (and most preferably 10%-11%), are exposed to this hot air for 5-60 seconds, depending upon the temperature of operation of the expander apparatus and moisture content of the rice. Lower operating temperatures require longer exposure times and higher operating temperatures require shorter exposure times. For 250°-260° C., the exposure time is about 11 seconds.

However, the dried rice may be alternatively expanded by employing: a hot fluid or gas, such as oil; or hot sand; or a hot metal plate; or radiant energy, such as microwave or infrared. Moisture contents, operating temperatures, and exposure times for such alternative expansion methods are as described hereinbefore for hot air expansion.

For hot air expansion in upwardly flowing air, exposure time may be conveniently selected by adjusting the velocity of the upwardly flowing hot air. In this manner the rice grain is suspended on and in the air column until it expands to at least several times its initial volume. Upon expansion, the reduced density of the grain allows the air to carry the expanded grain up out of the expansion chamber to an air/grain separator, where the rice grains are ejected from the hot air stream mechanically or gravitationally and are thereafter cooled by air at ambient temperature, i.e. less than about 30° C.

Figure 2:
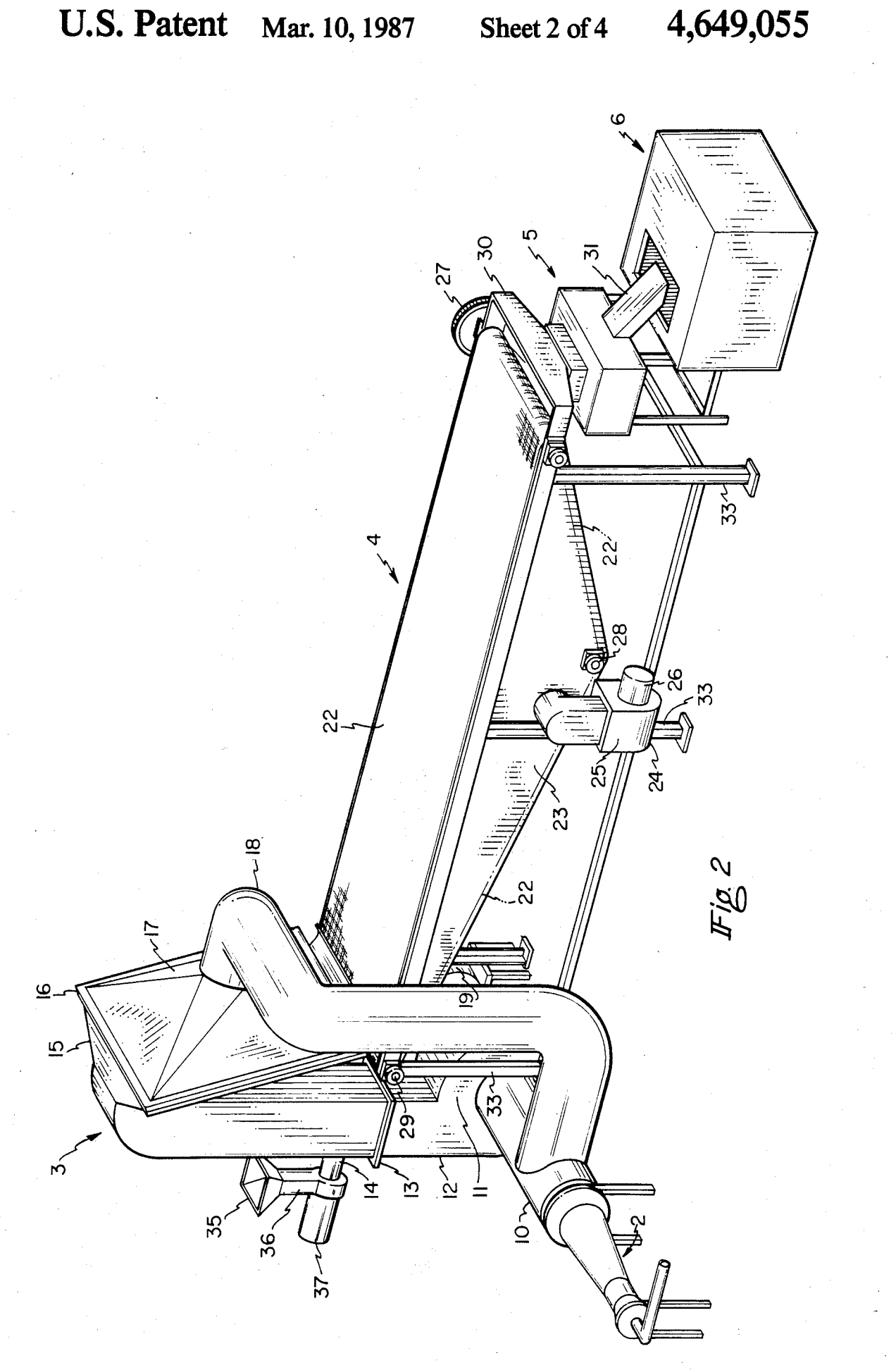

A particularly suitable apparatus for accomplishing this expanding, and subsequent cooling and packaging, steps is shown in FIG. 2. The same item number is used for the same part for various portions of apparatus depicted in the Figures. Continuing to refer to FIG. 2, there may be seen a simplified pictorial representation of an expander, and cooling and packaging apparatus. The expander apparatus 3 supplies hot expanded rice to cooling apparatus 4, which in turn supplies cooled, expanded rice to packaging apparatus 5.

The packaging apparatus 5 may be a conventional screening and shaker device that discharges expanded product through packaging apparatus product discharge duct 31 into a shipping container 6. The packaging apparatus 5 also serves to discard any defective rice to a waste container (not shown).

The expander apparatus 3 is supplied hot air by gas burner assembly 2. Gas burner assembly 2 may burn any available gas fuel, such as propane, butane, or natural gas, capable of cleanly heating air to temperatures above about 300° C. The hot air from gas burner assembly 2 is fed into hot air inlet pipe 10. Inlet pipe 10 is connected to the suction of blower 11. Blower 11 is operated by motor 19.

The discharge of blower 11 is connected to expander chimney 12 which extends upwardly in a vertical direction. The rice to be expanded is injected into chimney 12 through chimney feeder 14. To prevent rice from dropping down into the blower 11, backflow screen holder 13 (holding screen 60—see FIG. 7) is located below feeder 14.

Chimney 12 is attached at its upper end to chimney outlet 15. Chimney outlet 15 in turn is connected to recirculation collector box 17, with product screen holder 16 (holding screen 55—see FIG. 6) located therebetween. Box 17 is in turn connected to recirculation line 18, which returns hot air to inlet pipe 10.

Expander apparatus 3 operates at temperatures between 150°–320° C. Gas burner assembly 2 supplies hot air at the desired temperature. Motor 19 is operated to supply hot air from blower 11 at the desired air velocity to chimney 12. The air velocity should be sufficient to prevent incoming non-expanded rice grains from feeder 14 from falling onto screen holder 13 and its screen 60 (see FIG. 7).

The incoming grains are thus supported and tumbled on the hot air column passing up chimney 12. The expander apparatus 3 has an upward air flow adjusted to fluidize the non-expanded rice grains. Fluidization allows each grain to be uniformly exposed to the hot air. As the grain is quickly heated, it will begin to melt and develop superheated water in the grain. This superheated water flashes to steam and causes the melted grain to form bubbles, or pockets, of steam throughout the grain. The steam bubbles cause the grain to expand and thereby reduce the density of the grain. This fluidization provides a uniform and even heating of the grains and a substantially uniform expanded product.

Thus, the grains are supported by air velocity until they expand, whereupon the air carries them up the chimney 12 because of their reduced density. The air velocity decreases in the chimney outlet 15 because it has a larger cross-sectional area than chimney 12. The decrease in air velocity allows the expanded grains to fall downward, because of gravity. In so doing, the expanded grains fall out of the chimney outlet 15 through an opening 56 (see FIG. 6) along its bottom edge. Other conventional methods of removing the product from the air flow may also be employed, and are considered within the scope of expander apparatus 3, as described herein.

Product screen holder 16 and its screen 55 (see FIG. 6) are positioned at the end of outlet 15 to prevent any grains from passing into recirculation box 17 and into recirculation line 18.

Dampers (not shown) may be placed in recirculation line 18 and inlet pipe 10 to adjust the amount of air recirculated and the amount of hot air that is provided to the inlet of blower 11. Such dampers, blower speed and gas burner 2 are adjusted to support and tumble the unexpanded grains in hot air at the desired temperatures until they are expanded.

The expanded grains from chimney outlet 15 are collected on a wire mesh conveyor belt 22 which passes over a large cooling duct 23 mounted on supports 33. Cooling blower 24 pulls air from supply duct 25 which in turn pulls air from duct 23, thereby causing air to pass over and through the grains on belt 22. The cooling duct 23 cools the hot expanded rice grains by passing cool (ambient temperature) air over the grains. Cooling blower 24 is operated by motor 26 and draws in air at ambient temperature.

Conveyor belt 22 transports the expanded grains from the discharge point of chimney outlet 15 to product collector 30 at the discharge point of belt 22. Collector 30 in turn supplies the expanded grains to the packaging apparatus 5. Conveyor 22 is driven by drive pulley, or spocket, 27 and passes over bottom idler pulley, or sprocket, 28 and end idler pulley, or sprocket, 29.

Referring now to FIG. 3, there may be seen a different view of the apparatus depicted in FIG. 2. Specifically the expander apparatus 3, cooling apparatus 4 and packaging apparatus 5 are again depicted. The operation of these apparatus are as described hereinbefore.

Continuing to refer to FIG. 3, and specifically to cooling apparatus 4, there may be seen conveyor belt drive motor 32. Drive motor 32 is suitably connected by belt, or chain, to belt drive pulley, or sprocket, 27. Drive motor 32 is preferably of adjustable speed to allow adjustment of the speed of conveyor belt 22, if desired.

Expander apparatus 3 may also be seen to have a product deflector 41 attached to chimney outlet 15. Deflector 41 serves to prevent product from bouncing off of belt 22 as it exits outlet 15 through slot 56, and also serves to more evenly distribute the product at a uniform depth on belt 22.

Referring now to FIG. 4, the apparatus of FIG. 2 are again depicted in a different view. The proximity of gas burner assembly 2 to inlet pipe 10 of expander apparatus 3 is clearly shown. For lower operating temperatures of expander apparatus 3, it may be desirable to increase the distance between burner 2 and inlet 10, when burner 2 is supplied feed gas at a fixed rate. For higher operating temperatures, this distance may be decreased. For variable gas feed rates, it is unnecessary to change this distance.

Further, the operation of product collector 30 at the discharge of belt 22 may be clearly seen. This operation is, as previously described herein, to collect cooled product falling from belt 22 and transfer the product to the inlet, or supply, of packaging apparatus 5.

Referring now to FIG. 5, the feeder portion of expander apparatus 3 is depicted. Motor 37 turns an auger screw 38 located in chimney feeder 14. Unexpanded rice grains are loaded into inlet collector box 35 from which they pass by gravity feed into inlet feed duct 36. Inlet feed duct 36 provides rice to auger screw 38. Motor 37 may also be of adjustable speed, to adjust the rate of feed into chimney 12.

In this manner, rice is deposited in inlet box 35 and conveyed by auger screw 38 into chimney 12 through chimney feeder 14. There the rice is heated, tumbled and expanded as described hereinbefore.

Continuing to refer to FIG. 5, backflow screen 60 and backflow screen holder 13 are again depicted. As described hereinbefore, screen 60 prevents grains from inadvertently falling into blower 11 during continuous operation, or during startup or shutdown of expander apparatus 3. Holder 13 is mounted between opposing flanges 61 and 62 on chimney 12 by bolts 63 and nuts 64. This provides an air-tight seal at flanges 61 and 62.

Flanges 61 and 62 may be modified to have a space between them with a sliding "drawer" arrangement to allow for easy removal of screen 60, if desired. Such modification is within the scope of expander apparatus 3, as described herein.

Referring now to FIG. 6, there may be seen a portion of expander apparatus 3. Product screen 55 and product screen holder 16 may be clearly seen in FIG. 6. The cross-sectional area of outlet 15 may be clearly seen to be much larger than the cross-sectional area of chimney 12. This larger cross-sectional area allows the speed of the hot air exiting chimney 12 to decrease to a speed insufficient to transport expanded rice grains. Thus, the expanded rice grains fall, by gravitational forces, out through slot 56 of outlet 15. The product outlet slot 56 through which product exits from chimney outlet 15 may also clearly be seen.

Screen 55 is provided to prevent grains from passing into recirculation line 18 and then into blower 11. The mounting of screen 55 and holder 16 may be similar to the mounting of backflow holder 13 described herein.

Referring now to FIG. 7, there may be seen a portion of expander apparatus 3. Specifically, the mounting of screen 60 in holder 13 is clearly shown. Although screen 60 is depicted, for ease of illustration, as resting on a lip of holder 13 protruding into chimney 12, holder 13 is preferrably constructed so that this lip does not extend into chimney 12. Screen 60 and 55 (see FIG. 6) are wire-mesh metal screens capable of withstanding the operating temperatures of expander apparatus 3.

Referring now to FIG. 8, there may be seen a portion of chimney 12, in cross-section, of expander apparatus 3. Air flow baffles, or straighteners, 65 are shown in chimney 12. These straighteners 65 are located adjacent the outlet of blower 11 to minimize air flow turbulence in chimney 12. This provides uniform air velocity in chimney 12 to avoid "dead" spots in which rice grains might collect and be exposed to heat for excessive lengths of time.

After cooling, the expanded rice grains may be suitably packaged in package 6 to prevent damage to the expanded grain structure and to prevent any absorbtion of moisture by the expanded rice grains.

Embodiments of the preferred processes of the invention are hereinbelow described by way of example. The first example employs parboiled rice, the second example employs raw rice, and the third example also employs raw rice but in the one-step embodiment of the present invention.

EXAMPLE 1

Parboiled long grain (StarBonnet variety) rice was partially cooked in excess water of pH 6.0 for 18 minutes in a conventional water cooker at 95° C. The rice was quickly drained of excess water and steamed at 100° C. for 14 minutes. The rice was quenched for approximately 10 seconds in a water bath at 40° C. The rice was dried at 120° C. for about 11 minutes, then at 105° C. for about 11 minutes and finally at 102° C. for about 11 minutes; total drying time was 32 minutes. The above process was a continuous mode of operation.

The rice at 10.4% moisture content was continuously expanded in an upwardly flowing hot air stream at 265° C. for about 11 seconds, in apparatus as described hereinbefore.

Some of the expanded rice was broken open and inspected. It showed a multiply-porous interior having small pores and did not have a major longitudinal cavity along its axis. The volume of the puffed rice grain was about 3–4 times the volume of dried grains, on the average.

A 25 gm sample of the expanded rice was immersed in an excess of boiling water and mixed therewith. The rice was allowed to stand 90 seconds and was then drained and reweighed. The weight of the rehydrated sample was about 3 times the weight of the dehydrated sample.

The rehydrated sample was white with a yellowish tint, fluffy, and the individual grains were clearly distinguishable and not sticking to each other. The grains when crushed were completely cooked and when eaten were texturally comparable to conventionally prepared rice.

Samples were also employed in "instant" soup mixes and achieved a palatable consistency in about 45–60 seconds. The grains were as described hereinabove and remained palatable for as long as desired after the addition of boiling water. That is, the identity of the grains were texturally complete (i.e. they were detectably present when chewed) for as long as desired.

EXAMPLE 2

A 6.4 Kg sample of white (New Rex variety) rice was washed and soaked in excess water having a temperature of about 65° C. and a pH of 5.1 for 15 minutes. The rice was drained of excess water and steamed at atmospheric pressure (i.e. 100° C.) for 10 minutes. The rice was then immersed and agitated in a water bath having a pH of 5.1 and a temperature of 65° C. for about 60 seconds and then drained of excess water. The rice was then steamed and subsequently washed and agitated as described hereinabove two additional times, i.e. for 2 cycles of steaming followed by washing and agitating.

The rice was then again steamed at 100° C. for 15 minutes and thereafter quenched in tap water at about 25° C. for about 10 seconds and then drained. The moisture content after this fourth steaming was 68%, by weight.

The rice was subsequently dried in air at 50° C. for one hour followed by air at ambient temperature (about 35° C.) for 90 minutes.

The rice at 10.7% moisture content was batch expanded in an upwardly flowing hot air stream at 300° C. for 10–13 seconds, in apparatus as described hereinbefore.

The volume of the expanded rice was about 3 times the volume of the white rice. The interior of a broken grain exhibited a multiply-porous spongey interior and had no major longitudinal cavity.

A sample was rehydrated as in Example 1 and was about 3 times the weight of the dehydrated sample.

The expanded sample and rehydrated sample were both white in color. The rehydrated sample was fluffy, cooked, non-sticking and had good texture as in the Example 1 rehydrated sample. Tests of the expanded rice in instant soup mixes gave results as described in Example 1.

EXAMPLE 3

A 500 gm sample of brown (LaBelle variety) rice was washed and soaked for 4 hours in excess water at about 65° C. and then drained of excess water. The moisture content of the rice at the end of this 4 hour time was 29%, by weight. The rice was then steamed in an autoclave by pressurized steam at a pressure corresponding to 140° C. for 5 minutes. The rice was thereafter cooled by removing it from the autoclave and exposing it to air at ambient temperature, i.e. about 25° C. The rice was then dried for 72 hours in air at ambient temperature (approximately 25° C.).

Thereafter, the rice was milled to remove the bran layer in a conventional manner.

The rice at about 10% moisture content was then batch expanded in an upwardly flowing hot air stream at 275° C. for about 11 seconds, in apparatus as described hereinbefore.

The volume of the expanded rice was about 4 times the volume of the brown rice grain. The expanded grain interior similarly exhibited a multiply-porous interior as noted in previous Examples.

The expanded rice exhibited rehydration weights, texture and palatability as noted in previous Examples. However, the color of the expanded rice was white with a light yellow tint. Tests of the expanded rice in instant soup mixes gave results as described in Example 1.

EXAMPLE 4

Two four ounce samples of parboiled rice of Example 1 were obtained after gelatinization and glassification but prior to the preferred expansion, or puffing, step. Each sample was introduced into six ounces of boiling water and held at approximately 90° to 95° C. for twenty minutes. During the twenty minute rehydration time, test specimens were taken at seven, ten, fifteen and twenty minute intervals. The resulting rehydrated rice was edible and palatable after seven minutes, but the specimens taken at 7 and 10 minutes rehydration time were found to be somewhat rubbery or chewy. The specimens taken after 15 and 20 minutes rehydration were firm and palatable with good eating texture. Each grain was discrete and the rehydrated rice was noted to have relatively large grains.

Many other variations and modifications may be made in the apparatus and techniques hereinbefore described, by those having experience in this technology, without departing from the concepts of this invention. Accordingly, it should be clearly understood that the apparatus and methods depicted in the accompanying drawings and referred to in the foregoing description are illustrative only and are not intended as limitations on the scope of the invention.

What is claimed is:

1. A process for producing cooked and dehydrated rice which rapidly rehydrates in about one minute to a palatable consistency by mixing with hot water, comprising:
   hydrating a non-waxy variety of dry rice with water at a temperture of up to 65° C. for a period of time sufficient to raise the moisture content of said rice from an initial 8-15% to up to 70%;
   gelatinizing said hydrated rice at a temperature above 65° C.;
   glassifying said gelatinized rice in a water limiting environment which maintains the moisture content of said rice below about 75%; and
   thereafter drying said glassified rice.

2. A cooked and dehydrated rice product produced by the process of claim 1.

3. The process of claim 1, wherein in the hydrating step said non-waxy rice is raised, to a moisture content above about sixty percent.

4. The process of claim 3, wherein the glassifying step is performed by steaming said hydrated rice at substantially atmospheric pressure.

5. The process of claim 4, wherein said step of hydrating comprises soaking said non-waxy rice in excess water.

6. The process of claim 5, wherein said water has a pH in the range between 4.5 to 7.0.

7. The process of claim 1, further comprising the step of first hydrating said non-waxy rice to a moisture content below about sixty percent prior to complete gelatinization thereof.

8. The process of claim 7, wherein the steps of gelatinizing and glassifying are performed by steaming said hydrated rice at a pressure greater than atmospheric pressure.

9. The process of claim 8, wherein said step of hydrating comprises soaking said non-waxy rice in excess water.

10. The process of claim 9, wherein said water has a pH in the range between 4.5 to 7.0.

11. A process for producing cooked and dehydrated rice, comprising:
    partially gelatinizing and hydrating a selected non-waxy parboiled rice in moderately acidic, hot, excess water,
    draining said hydrated rice,
    steaming said drained rice at atmospheric pressure to complete gelatinization and to glassify said rice;
    quenching said steamed rice in water and drying said quenched rice.

12. A process for producing cooked and dehydrated rice, comprising:
    soaking raw non-waxy rice in water at a temperature below the gelatinization temperature of said raw rice,
    draining said soaked rice,
    steaming said soaked rice at a pressure greater than atmospheric pressure to gelatinize and to glassify said rice,
    cooling said glassified rice, and
    drying said cooked rice.

13. A process for producing cooked and dehydrated rice, comprising:
    soaking non-waxy raw rice in moderately acidic water at a temperature below the gelatinization temperature of said raw rice,
    steaming said soaked rice at atmospheric pressure to partially gelatinize said raw rice,
    washing and agitating said steamed rice,
    draining said washed rice,
    steaming said drained rice at atmospheric pressure to further partially gelatinize said drained rice,
    washing with agitation, draining and steaming said steamed rice a plurality of times to complete gelatinization and to glassify said steamed rice,
    quenching said multiply steamed rice,
    draining said quenched rice, and thereafter drying said quenched rice.

14. The process of any one of claims 1, 11, 12, 13, 3, 4, 5, 6, 7, 8, 9 or 10, further comprising expanding said glassified and dried rice.

15. An expanded cooked and dehydrated rice produced according to the process of claim 14.

* * * * *